United States Patent

[11] 3,593,604

[72] Inventor Robert Irwin Sattler
     Grosse Point Shores, Mich.
[21] Appl. No. 792,100
[22] Filed Jan. 17, 1969
[45] Patented July 20, 1971
[73] Assignee La Salle Machine Tool, Inc.
     Warren, Mich.

[54] MACHINE TOOL INDEXING APPARATUS
     10 Claims, 6 Drawing Figs.
[52] U.S. Cl. .................................................. 82/36 A,
     74/822, 74/826
[51] Int. Cl. .................................................. B23b 29/32
[50] Field of Search ........................................ 82/36 A;
     74/822, 823, 824, 826

[56] References Cited
     UNITED STATES PATENTS
2,417,366  3/1947  Kylin et al. .................... 74/823
3,010,348  11/1961 Swanson et al. ............... 82/36 X
3,222,955  12/1965 Ross et al. ..................... 74/826

Primary Examiner—Leonidas Vlachos
Attorney—Olsen and Stephenson

ABSTRACT: Machine tool apparatus wherein a plurality of sequentially usable tools are mounted on an indexable turret head so that a large number of parts can be machined to exactly the same dimensions without requiring machine shutdown for tool replacement purposes. The apparatus includes a rotatable indexable spindle for rotating the head so as to place a new set of tools in operative position and means for moving the spindle axially to a predetermined fixed position in which the indexable tools are precisely located along the spindle axis. Apparatus is disclosed wherein the spindle is both rotated and moved axially to precise positions in response to actuation of a single motor.

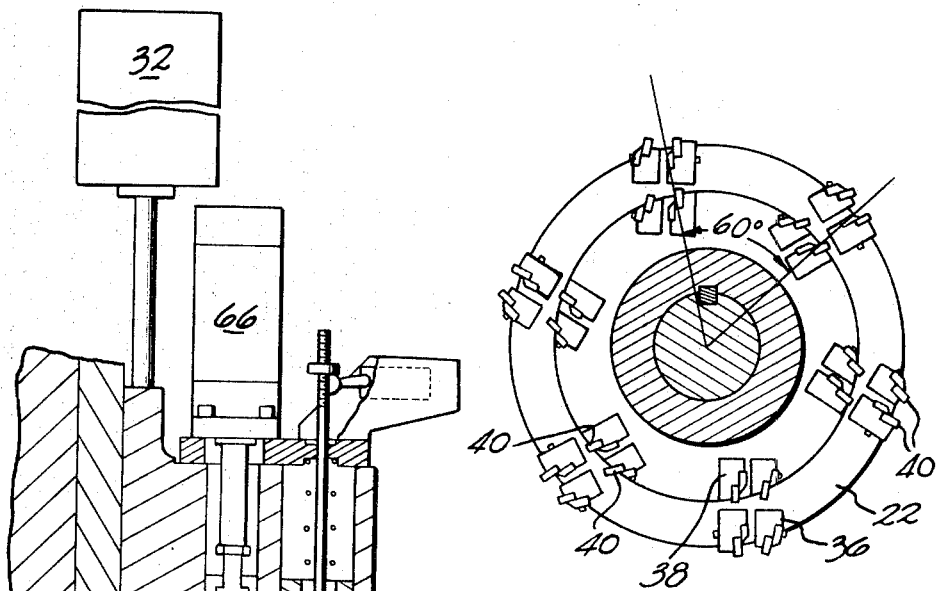
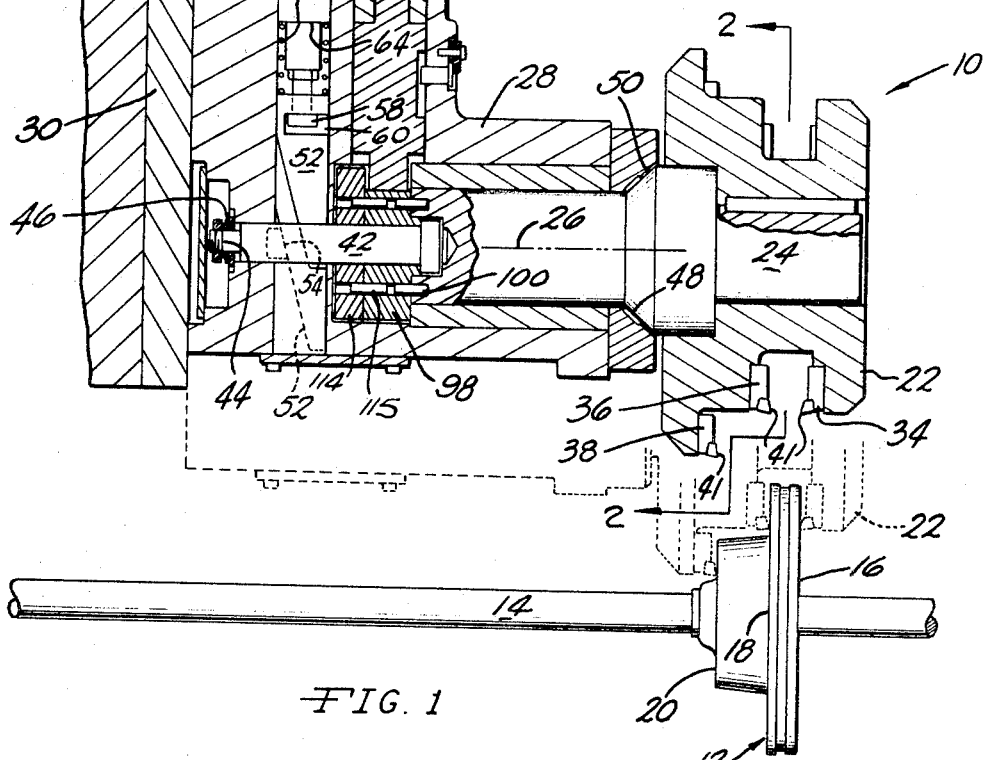
FIG. 2
FIG. 1
INVENTOR
ROBERT I. SATTLER
BY
Olsen and Stephenson
ATTORNEYS

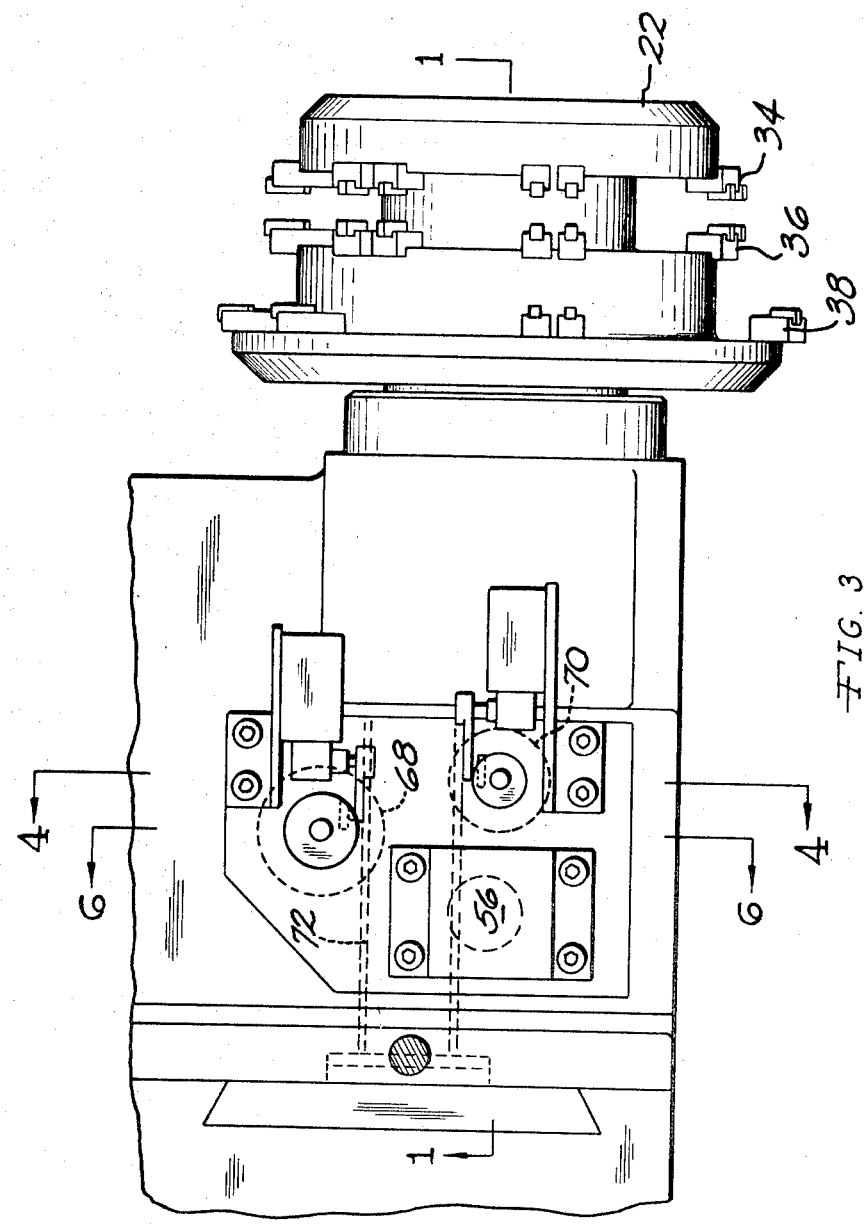

INVENTOR
ROBERT I. SATTLER

BY
Olsen and Stephenson
ATTORNEYS

MACHINE TOOL INDEXING APPARATUS

BACKGROUND OF THE INVENTION

Many automated operations of the type wherein workpieces are continuously fed through a plurality of work stations include a machining station employing machine tools which inevitably become worn to the extent that they no longer perform within satisfactory limits. In the event replacement of such tools is required, it becomes necessary to shut down the entire automated line during the time that a tool change is being made. Such shutdown time is undesirable for many reasons and it is therefore desirable to provide for such a tool change without the necessity for shutting down the line.

The principal object of this invention, therefore, is to provide tool indexing apparatus which enables movement of a new set of tools to an operative position replacing a worn set of tools without the necessity for shutting down the line.

SUMMARY OF THE INVENTION

In the machine tool apparatus of this invention, a turret head is provided with a series of tools which are sequentially usable so that the automated line must be shutdown only after all of the tools in the series have been used. The turret head is mounted on a spindle which is rotatably indexable and is also shiftable axially to position the tools on the turret head both angularly and axially to assure their precise position relative to the work to be machined. When indexing movement of the turret head is desired, actuation of a single motor, which in this case is a fluid operated cylinder assembly, is operable to both release the spindle for rotatable indexing movement, index the spindle through a precise angular increment, and reposition the spindle in a direction axially thereof so as to precisely locate the tools which have been moved into operative position. This is accomplished by providing a pair of toothed members on the spindle and a pair of reciprocally movable members each of which actuates one of the toothed members. When the spindle is released, one of the members is moved so as to rotate one of the toothed members to in turn rotate the spindle through the approximate angular increment necessary for indexing. Concurrently, with axial positioning of the spindle, the other reciprocal member is actuated so as to move the other toothed member to a precise position in which the spindle is indexed through the exact angular increment desired for tool indexing. As a result, indexing movement of the tools is quickly accomplished and precise positioning of the tools both angularly and axially of the spindle is insured.

Further objects, features and advantages of this invention will become apparent from a consideration of the following description, the appended claims, and the accompanying drawing in which:

FIG. 1 is a longitudinal sectional view of the tool indexing apparatus of this invention, as seen from substantially the line 1-1 in FIG. 3, showing the apparatus in a position preparatory to indexing in solid lines and in operative position relative to a workpiece in broken lines;

FIG. 2 is a transverse sectional view of the tool carrying turret head in the tool indexing apparatus of this invention as seen from substantially the line 2-2 in FIG. 1;

FIG. 3 is a fragmentary plan view of the machine tool apparatus of this invention;

Figure 4:
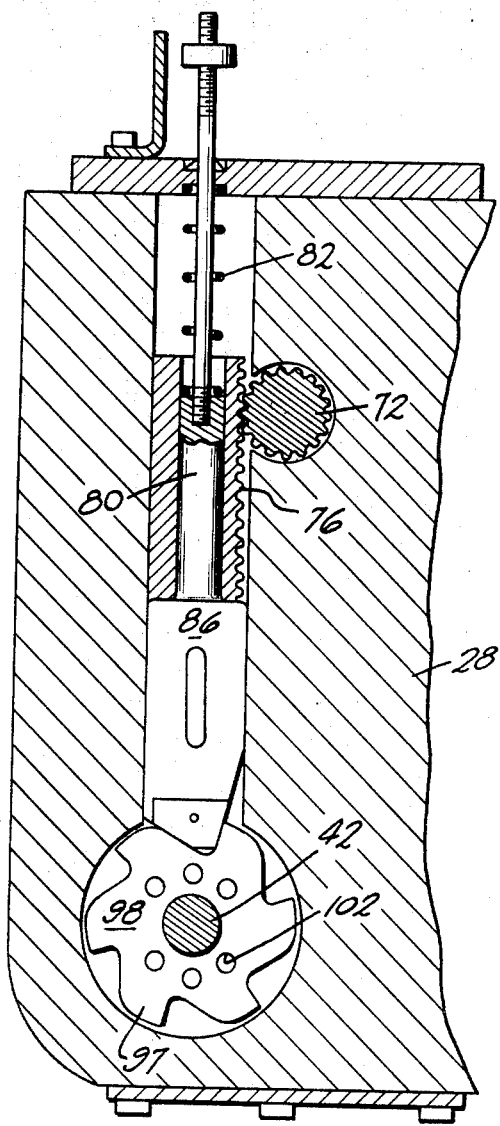
FIG. 4 is a transverse sectional view of a portion of the apparatus of this invention as seen from substantially the line 4-4 in FIG. 3, illustrating the mechanism for finally angularly positioning the turret head, and showing this mechanism in a position corresponding to a final location of the turret head in an angularly moved position.
Figure 5:
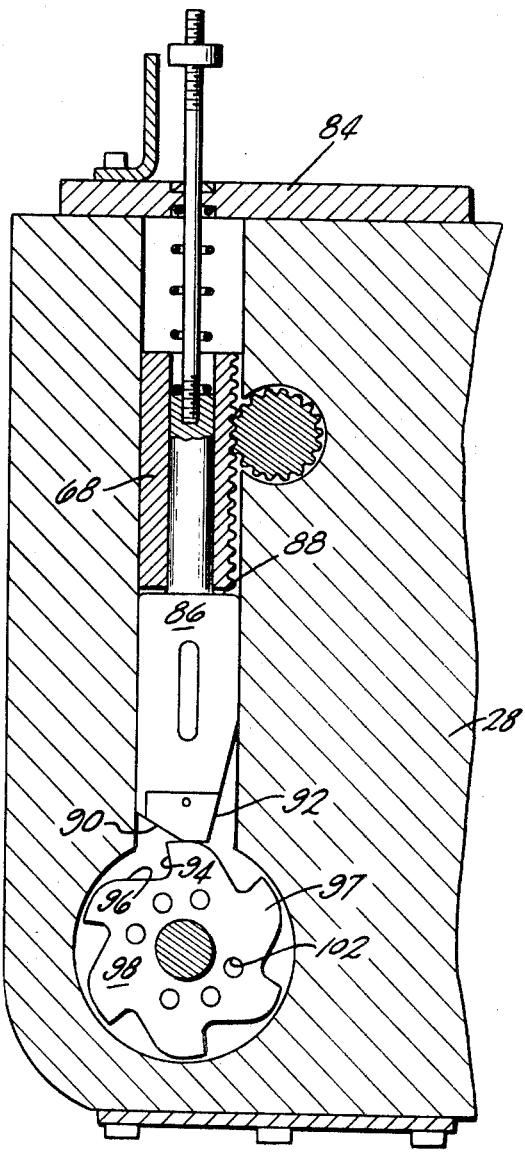
Figure 6:
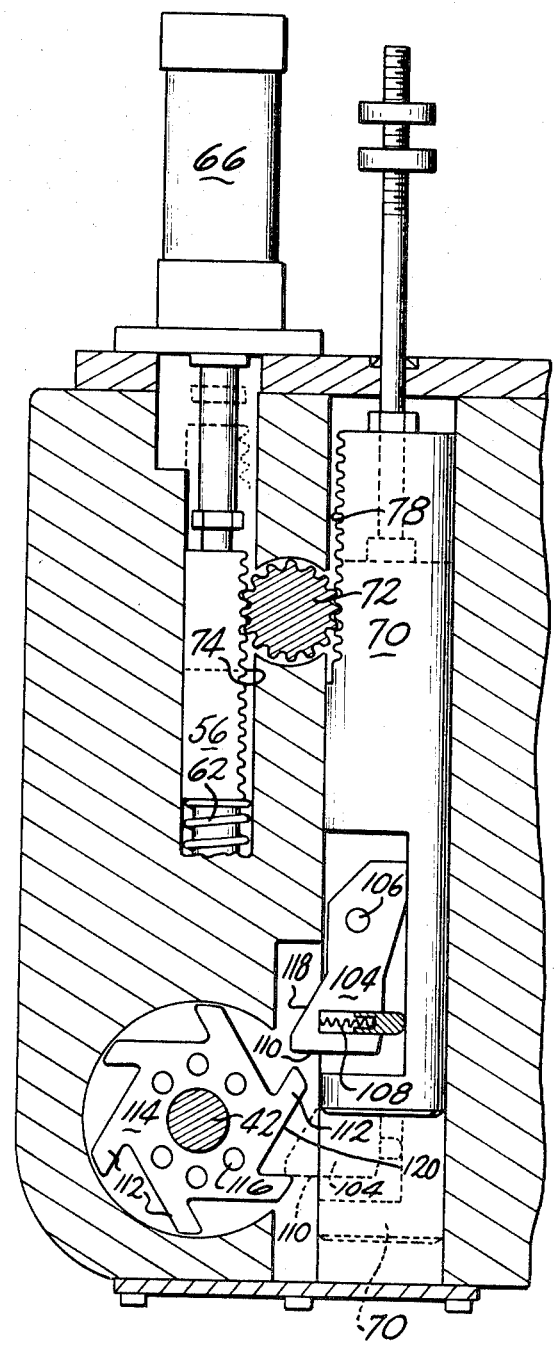

FIG. 5 is a sectional view of a portion of the apparatus of this invention, illustrated similarly to FIG. 4, showing the turret head positioning mechanism in an intermediate position which it assumes during angular positioning of the turret head; and FIG. 6 is a transverse sectional view of another portion of the tool indexing apparatus of this invention as seen from substantially the line 6-6 in FIG. 3 illustrating the mechanism which initially angularly indexes the turret head, showing the mechanism in solid lines prior to indexing and in broken lines following indexing.

With reference to the drawing, the machine tool indexing apparatus of this invention, indicated generally at 10, is illustrated in FIG. 1 in a form for machining a disc brake element 12 illustrated as being mounted on a transfer bar 14 operable to both rotate the element 12 about the axis of the bar 14 and move the element 12 through a plurality of stations spaced axially of the bar 14, including the machining station at which the apparatus 10 is located. It is to be understood that the bar 14 is shown for illustrative purposes only, any suitable element transfer apparatus and any suitable structure for rotating the element 12 about its axis being satisfactory. At the station at which the apparatus 10 is located, the faces 16, 18 and 20 of the element 12 are to be machined so that they are located predetermined distances from each other.

The apparatus 10 includes a tool carrying turret head 22 secured to a spindle 24 having an axis 26, the spindle 24 being in turn supported on a body structure 28 mounted for up and down sliding movement on a slide assembly 30. A motor 32 is illustrated for moving the body 28 up and down on the slide 30. The turret head 22 is provided with three sets 34, 36 and 38 of tools for machining the faces 16, 18 and 20, respectively, and as shown in FIG. 2, each set 34, 36 and 38 includes six pairs of tools 40, each pair being spaced an angular increment of 60° from the adjacent pair in the set. The cutting edges 41 of all tools in a set are located in the same plane perpendicular to the axis 26. The pairs of tools 40 in the sets 34, 36 and 38 are aligned in a direction parallel to the spindle axis 26 so that in any one of six angularly moved positions of the spindle 24, the tools 40 in the sets 34, 36 and 38 are operable to machine the surfaces 16, 18 and 20. When these three pairs of tools 40 become worn, new tools 40 can be moved to positions in which they effectively replace the worn tools by moving the turret head 22 through an angular increment of 60°.

As shown in FIG. 1, the spindle 26 is loosely secured to a drawbar 42 which extends rearwardly from the spindle 24 and terminates in a threaded extension 44 on which a disc spring 46 is mounted so as to normally urge the spindle 24 toward the left as viewed in FIG. 1. The spring 46 exerts a small force on the spindle 24 which does not prevent rotation of spindle 24. The body 28 is provided with an inclined stop surface 48 adapted to be engaged by a correspondingly inclined surface 50 on the spindle 24, the body surface 48 being located such that when the spindle surface 50 is engaged therewith, the tool sets 34, 36 and 38 are positioned in precise locations relative to the spindle axis 26 such that they will do the desired machining work on the surfaces 16, 18 and 20. When the surfaces 48 and 50 are firmly engaged, rotation of spindle 24 is prevented. A wedge member 52 is movable up and down in a slot in the drawbar 42 between the broken and solid line positions shown in FIG. 1. When the wedge 52 is in its lower or applied position, it engages a similar wedge 54 in the drawbar 42 such that the wedge 52 applies an axial force to the drawbar 42 effective to move the spindle surface 50 firmly against the stop surface 48. When the wedge 52 is in its upper or release position, the force urging the spindle 24 against the stop surface 48 is released so that the spindle 24 can rotate about its axis 26 and relative to the drawbar 42.

A plunger 56 which extends perpendicular to the axis 26 has a head 58 at its lower end which is loosely positioned in a slot 60 in the wedge 52 so that when the plunger 56 is moved upwardly, as shown in FIG. 1, the head 58 will be moved upwardly so as to move the wedge 52 from its applied position to its release position. A spring 62 extends between the lower end 64 of the plunger 56 and the wedge 52 so that when the plunger 56 is moved downwardly, the spring 62 transmits a yieldable force from the plunger 56 to the wedge 52 holding the wedge 52 in its applied position and holding the spindle 24 against the stop surface 48. A suitable motor, such as the fluid actuated cylinder assembly 66 is provided for moving the plunger 56 up and down to in turn move the wedge 52 up and down between its release and applied positions.

As shown in FIG. 3, a pair of upright shafts 68 and 70 are positioned adjacent the plunger 56. A pinion gear 72, of substantial length, is positioned in meshing engagement with rack teeth 74 on the plunger 56 (FIG. 6) and in meshing engagement with similar rack teeth 76 and 78 provided on the shafts 68 and 70, respectively. Since the shafts 68 and 70 are disposed on transversely opposite sides of the gear 72, when the plunger 56 is moved upwardly, in response to actuation of the cylinder assembly 66, the shaft 70 is moved downwardly and the shaft 68 is moved upwardly.

As shown in FIGS. 4 and 5, the shaft 68 is hollow, and has a rod 80 extending therethrough, the rod 80 being urged downwardly by a spring 82 which extends between the upper end of the rod 80 and a cover 84 on the body 28. At its lower end, the rod 80 is enlarged so as to form a finger 86 having a shoulder 88 at its juncture with the rod 80. The lower end of the shaft 68 engages the shoulder 88 so that when the shaft 68 is moved downwardly, it abuts the shoulder 88 and moves the finger 86 downwardly. However, when the shaft 68 is moved upwardly, it separates from the finger 86 which is then movable upwardly only in response to a force thereon opposing the pressure of the spring 82. At its lower end, the finger 86 has reversely inclined surfaces 90 and 92 shaped to engage correspondingly inclined edge surfaces 94 and 96 on teeth 97 formed on a toothed member 98 which is rotatably supported on the drawbar 42. A plurality of locking pins 100 are positioned in openings 102 in the toothed member 98 and extend into the spindle 24 so that the spindle 24 is rotated by the pins 100 in response to rotation of the toothed member 98. By virtue of the correspondingly inclined surfaces 90, 96 and 92, 94 on the finger 86 and the toothed member 98, when the finger 86 is moved downwardly to a position between adjacent teeth 97, as shown in FIG. 4, the toothed member 98 is rotated slightly to a precise angular position. The member 98 is initially aligned with the turret head 22 so that each position of the member 98 in which the finger 86 is movable between adjacent teeth 97 corresponds to an operative position of pairs of tools 40 in the tool sets 34, 36 and 38. When the shaft 68 is moved upwardly, to its position shown in FIG. 5, in which it does not prevent upward movement of finger 86, the finger 86 is movable upwardly, in response to clockwise rotation of the toothed member 98 from its position shown in FIG. 4 to its position shown in FIG. 5, against the pressure of the spring 82 so as to enable the toothed member 98 to rotate approximately 60°.

As shown in FIG. 6, the shaft 70 carries a dog 104 mounted for rotational movement about a pin 106 and urged by a spring 108 to the position shown in solid lines in FIG. 6. In this position of the dog 104, its lower end 110 is in position to engage a tooth 112 on a toothed member 114 rotatably mounted on the drawbar 42 at a position axially adjacent the toothed member 98 as shown in FIG. 1. Drive transmitting pins 115, positioned in the openings 102 in the toothed member 98, extend into openings 116 in the toothed member 114 so that in response to rotation of the toothed member 114, the toothed member 98 and in turn the spindle 24 are similarly rotated. The illustrated pins 100 and 115 thus function to connect the toothed members 98 and 114 to each other and to the spindle 24. It should be understood that other connectors such as screws, are similarly useable for this purpose.

As shown in FIG. 6, the toothed member 114 has six teeth 112 positioned so that in response to downward movement of the shaft 70, and consequent downward movement of the dog 104 from its solid line position to its broken line position, the dog moves the toothed member 114 through an angular increment of slightly less than 60°, for a purpose to appear presently. In other words, the stroke of shaft 70 is slightly less than the stroke required to move the member 114 through an angular increment of a full 60°. When the shaft 70 is retracted, the dog 104 engages the next tooth 112 which is now above the originally contacted tooth. By virtue of the inclined dog surface 118 and the similarly inclined tooth surface 120, this tooth engagement causes the dog 104 to pivot inwardly against the pressure of spring 108 so that the dog can return to its upper position shown in solid lines.

Operation

In the operation of the apparatus 10, assume that the pairs of teeth 40 which have been in position at the lower edge of the head 22 to machine the surfaces 16, 18 and 20 have become sufficiently worn to require replacement. The body 28 is moved upwardly on the slide 30 to its position shown in solid lines in FIG. 1 in which the next element 12 to be machined can be moved to the position shown in FIG. 1. At such time, the wedge 52 is in its lower or applied position. The cylinder assembly 66 is actuated to move the plunger 56 upwardly to in turn move the wedge 52 upwardly to its release position so that the axial force applied by the wedge 52 to the spindle 24 holding the spindle surface 50 firmly against the stop surface 48 is released.

In response to upward movement of the plunger 56, the pinion gear 72 is rotated in a clockwise direction, as viewed in FIG. 6, through an angle necessary to move the shaft 70 downwardly to in turn move the dog 104 downwardly to its position shown in broken lines in FIG. 6. This downward movement of the dog 104 results in engagement of the dog 104 with one of the teeth 112 on the toothed member 114 causing the toothed member 114 to be rotated through an angle of slightly less than 60°. Since the toothed member 114 is connected by the pins 115 to the toothed member 98, this causes a rotation in a clockwise direction of the toothed member 98 through the same angle. The rotation of the gear 72 which moved shaft 70 downwardly also caused the shaft 68 to be moved upwardly to its position shown in FIG. 5. Consequently, rotation of the toothed member 98 causes the finger 86 to first ride upwardly on a tooth 97 from a position between a first pair of teeth 97 to the intermediate position shown in FIG. 5, following which the spring 82 forces the finger 86 downwardly between the next pair of teeth 97. Since the toothed member 98 is connected to the spindle 24 by the drive pins 100, this driving of the toothed member 114 through an angular increment of slightly less than 60° causes a corresponding rotation of the spindle 24.

Immediately following actuation of the cylinder assembly 66 to move the plunger 56 upwardly, the cylinder assembly 66 is reverse actuated to cause the plunger 56 to be moved downwardly to a position in which it compresses the spring 62, thereby causing the spring 62 to force the wedge 52 downwardly to its applied position in broken lines in FIG. 1. Concurrently with this downward movement of the plunger 56, the pinion 72 is rotated in a counterclockwise direction, as viewed in FIG. 6, to move the shaft 70 so as to return the dog 104 to its upper position preparatory to the next tool indexing operation. Rotation of the pinion 72 in the counterclockwise direction results in downward movement of the shaft 68 to a position in which it forces the finger 86 into firm engagement with the tooth surfaces 94 and 96 which are spaced one tooth from the surfaces with which the surfaces 94 and 96 were previously engaged. This downward movement of the finger 86 thus rotates the toothed member 98 through a small angle which, when added to the angular increment through which the toothed member 114 was moved by the dog 104, is equal to precisely 60°. Movement of the toothed member 98 is transmitted to the spindle 24 so as to precisely position the head 22 in a position in which the next pairs of teeth 40 will be in exactly the same position that the worn teeth 40 were in prior to indexing. The dog 104 is thus employed to perform most of the rotating function, with the finger 86 being utilized to perform the fine positioning of the spindle 24 necessary to precisely locate the turret head 22. This reduces the possibility of wear of the finger surfaces 90 and 92 and the tooth surfaces 94 and 96 which must be very accurately maintained in the desired relation.

It can thus be seen that when the wedge 52 is moved to its applied position by movement of the plunger 56, the wedge 52 applies a force to the spindle 24 which effectively locates the spindle 24 in an axial direction. Concurrently, with this action, the movement of the plunger 56 is transmitted by the pinion 72 to the toothed member 98 which precisely locates the spindle 24 in an angular position. Thus, the single movement of the plunger 56 is utilized to locate the tools 40 both in a direction along the axis 26 and in an angular position relative to the axis 26. In the illustrated embodiment of the invention in which six pairs of teeth 40 are in each set of teeth, the above cycle of operation can be repeated five times before it is necessary to replace the worn teeth 40. It is to be understood that more or less teeth 40 can be arranged in each set of teeth without departing from the invention.

It will be understood that the machine tool indexing apparatus which is herein disclosed and described is presented for purposes of explanation and illustration and is not intended to indicate limits of the invention, the scope of which is defined by the following claims.

What I claim is:

1. Machine tool apparatus comprising:
   a rotatably indexable spindle having an axis;
   a tool head mounted on said spindle,
   a plurality of tools mounted on said head at positions spaced in equal angular increments about said axis,
   body means supporting said spindle for movement both axially thereof and rotatably about said axis,
   spindle actuating means movable between applied and release positions and operable in said applied position to move said spindle in a direction axially thereof to a predetermined fixed position and operable in said release position to release said spindle for rotatable indexing movement,
   means connected to said spindle and operative in response to movement of said actuating means to said release position to rotate said spindle from an initial position through substantially said angular increment, and
   means connected to said spindle and operative in response to movement of said actuating means to said applied position to finally position said spindle in a position rotated exactly a predetermined angular increment from said initial position.

2. Machine tool apparatus according to claim 1 wherein said tools are arranged in at least one set, all of the tools in a set being disposed so that the cutting edges thereof are in a common plane perpendicular to said axis.

3. Machine tool apparatus according to claim 1 further including slide means mounting said body for translatory back and forth movement in a direction transversely of said axis.

4. Machine tool apparatus according to claim 1 wherein said spindle actuating means consists of plunger means movable transversely of said axis, and wedge means operatively associated with said plunger means and said spindle for exerting an axial force on said spindle in said applied position of said spindle actuating means.

5. Machine tool apparatus according to claim 4 further including a pair of substantially parallel shafts, gear means meshing with said shafts and said plunger means so that in response to movement of said plunger in a direction transversely of said axis, said shafts are moved in opposite directions, and wherein said means for rotating said spindle are connected to said shafts.

6. Machine tool apparatus according to claim 5 wherein said means for rotating said spindles includes toothed members connected to said spindle and positioned relative to said shafts so that in response to axial movement of said shafts in the same direction, said toothed members are rotated.

7. Machine tool apparatus comprising a rotatably indexable spindle having an axis, a turret head mounted on one end of said spindle, a plurality of tools mounted on said head at positions spaced in equal angular increments about said axis, body means supporting said spindle for movement both axially thereof and rotatably about said axis, coacting stop means on said body means and said spindle engageable on axial movement of said spindle in one direction to define a predetermined axial position of said spindle corresponding to a desired position of said tools along said axis, wedge means operatively associated with said spindle and movable transversely thereof between applied and release positions, said wedge means in the applied position thereof being operable to move said spindle axially thereof to said predetermined position and being operable in said release position to release said spindle for rotatable movement, plunger means movable transversely of said axis and connected to said wedge means for moving said wedge means between said applied and release positions, and means operable in response to movement of said plunger means so as to move said wedge means from an applied position to a release position and return to said applied position for rotating said spindle through an angle corresponding precisely to said angular increment.

8. Machine tool apparatus according to claim 7 wherein said last mentioned means includes a pair of toothed members secured in coaxial relation to said spindle, means operable in response to movement of said plunger means so as to move said wedge means from its applied position to its release position for moving one of said toothed members about said axis so as to rotate said spindle through approximately said angular increment, and means operable in response to movement of said plunger means so as to move said wedge means to its applied position for completing said rotation of said spindle so as to finally locate said spindle in a position rotated precisely through said angular increment.

9. Machine tool apparatus according to claim 8 further including spring means extending between said plunger means and said wedge means and operable in said applied position of said wedge means for applying a resilient force from said plunger means to said wedge means.

10. Machine tool apparatus according to claim 8 further including a pair of substantially parallel reciprocally movable members engageable with said toothed members to effect rotation thereof, gear means positioned in meshing engagement with said plunger means and said reciprocal members so that in response to movement of said plunger means, said members are moved in opposite directions.